(12) United States Patent
Choi

(10) Patent No.: US 6,425,481 B1
(45) Date of Patent: Jul. 30, 2002

(54) STORAGE CASE FOR INFORMATION CARRYING DISKS

(75) Inventor: King Yeung Choi, Hong Kong (HK)

(73) Assignee: Encore Holdings Limited (HK)

( * ) Notice: Subject to any disclaimer, the term of this patent is extended or adjusted under 35 U.S.C. 154(b) by 0 days.

(21) Appl. No.: 09/602,633

(22) Filed: Jun. 22, 2000

(51) Int. Cl.$^7$ ............................................ B65D 85/57
(52) U.S. Cl. .................................. 206/308.1; 206/310
(58) Field of Search ............................... 206/303, 307, 206/308.1, 309, 310, 493

(56) References Cited

U.S. PATENT DOCUMENTS

| | | | |
|---|---|---|---|
| 5,251,750 A | | 10/1993 | Gelardi et al. ............... 206/310 |
| 5,400,902 A | * | 3/1995 | Kaminski .................... 206/310 |
| 5,526,926 A | | 6/1996 | Deja ........................ 206/308.1 |
| 5,788,068 A | | 8/1998 | Fraser et al. ................. 206/310 |
| 5,944,181 A | * | 8/1999 | Lau .......................... 206/308.1 |
| 6,041,923 A | | 3/2000 | Furutsu ..................... 206/308.1 |
| 6,116,417 A | * | 9/2000 | Yoshinaga et al. ........... 206/310 |
| 6,186,322 B1 | * | 2/2001 | Dautzenberg ................ 206/310 |
| 6,227,362 B1 | * | 5/2001 | Cheung .................... 206/308.1 |

* cited by examiner

Primary Examiner—Jim Foster
(74) Attorney, Agent, or Firm—Ostrolenk, Faber, Gerb & Soffen, LLP

(57) ABSTRACT

An apparatus is provided for holding a compact disk. The device relies on the central hole of a disk and provides a body portion which includes a disk support member onto which the disk can rest. At least two members each pivotably dependent from and connected to said base a flexible arm extending downwardly from said disk support member provide a disk locating means receivable in the central hole of said disk. Integrally formed with the members are disk lifting arms which extend outwardly from each said member. By way of an actuating means movement of the members from a disk locating condition to a disk released condition is achievable whereby when a disk is supported on said disk support member, and pressure is applied to said actuating means, the members move toward each other to release the disk locating means from the central hole and simultaneously the disk lifting arms displace the disk upwardly from said disk support means.

10 Claims, 4 Drawing Sheets

STORAGE CASE FOR INFORMATION CARRYING DISKS

The present invention relates to storage case for information carrying disks.

BACKGROUND OF THE INVENTION

Storage cases for compact disks or digital video disks or the like have been well developed from what is commonly known as the original jewel case. It is well appreciated by designers of disk cases that it is highly undesirable for any portion of the case to be in contact with the information carrying surfaces of the disk. It is to this extent that developments in relation to the retention of disks to the case and the mechanisms for moving the disks from the case have involved means which limit the contact of the case with the disk to either the portions immediately surrounding the central hole of the disk and/or to portions at the disks perimeter.

Some case designs have not only addressed the need for adequate retention of the disk to the case but have also provided the convenient ejection of the disk from the retention means. This has been particularly so because of the advent of digital video disk. The construction of a digital video disk is more complex than the standard compact disk. Because of the more complex laminated structure the bending of a disk during the removal or insertion of the disk into the case is undesirable.

U.S. Pat. No. 5,788,068 has addressed such a problem in a specific way. The product of this patent has incorporated ejection arms which become operative in ejecting the disk for removal from the case when the central retaining portion is pressed by a user.

The ejection arms are spring loaded when the disk is in an engaged condition with the case and operate to eject the disk once retention lips of the central retaining portion are displaced from the upper surface of the disk.

U.S. Pat. No. 5,251,750 avoids the need for any spring loading of ejection means against the compact disk. This patent describes a central retaining rosette which incorporates ejection arms pivotable about a fulcrum located on the base of the compact disk case. A central button able to be pushed by the user is hingably engaged to the ejection arms to move the ejection arms from a disk receiving position to a disk ejection position. An over centre snap through is also incorporated. The configuration of this invention is however complex and requires the operative engagement of the fulcrum of the arms with a base surface for the pivoting of the ejection arms. Similarly in U.S. Pat. No. 5,526,926, the invention which is described, incorporates ejections arms which pivot about the point of contact of ejection arm legs which locate on a lower base plate. In this arrangement, the central rosette is provided as an insert for a base of a case for the compact disk.

This arrangement requires a two part moulding to provide both the case and the central retaining rosette. The effect of pivoting of the ejection arms which results in the simultaneous release of the disk locating members with the central aperture of the disk. An effective pivot point is provided by the point of contact of the ejection arm leg with the base of the case.

It is therefore an object of the present invention to provide storage case for information carrying disks which will at least provide the public with a useful choice.

SUMMARY OF THE INVENTION

Accordingly in a first aspect the present invention consists in an apparatus for holding a compact disk having a central hole, the apparatus comprising a body portion which includes a disk support member at least two members each pivotably dependent from and connected to said base by at least one arm extending downwardly from said disk support member said at least two members each providing a disk locating means receivable in the central hole of a said disk a disk lifting arm integrally formed from, and extending outwardly from each said member actuating means to move said members from a disk locating condition to a disk released condition whereby when a disk is supported on said disk support member, and pressure is applied to said actuating means, the at least two members move toward each other to release the disk locating means from the central hole and simultaneously said disk lifting arms displace said disk upwardly from said disk support means.

Preferably each said disk locating means provides at least one catch member disposed outwardly from each said disk locating means to locate, when a disk is received thereby, onto the outwardly facing surface of said disk when a disk at attempted to be removed without said pressure being applied to said actuation means.

Preferably said lifting arms provide lifting regions for the engagement with the downwardly facing surface of said disk, and are positioned outwardly on said lifting arms to a distance no greater than for said lifting regions to impinge on the information carrying surface of the disk.

Preferably each said member is pivotably dependent from said disk support member by two said arms, each arm being provided to be resiliently cantilevered arm from said disk support member.

Preferably said members are independently movable to each other.

Preferably in a disk locating condition, each said member to act together to allow said disk to rest on said disk support member and places the disk locating means in a position to allow said disk to be free to spin about said disk locating means.

These and other features of the invention are apparent in the disclosure which includes the above and ongoing written description with the claims and the drawings.

DETAILED DESCRIPTION OF THE DRAWINGS

Figure 1:
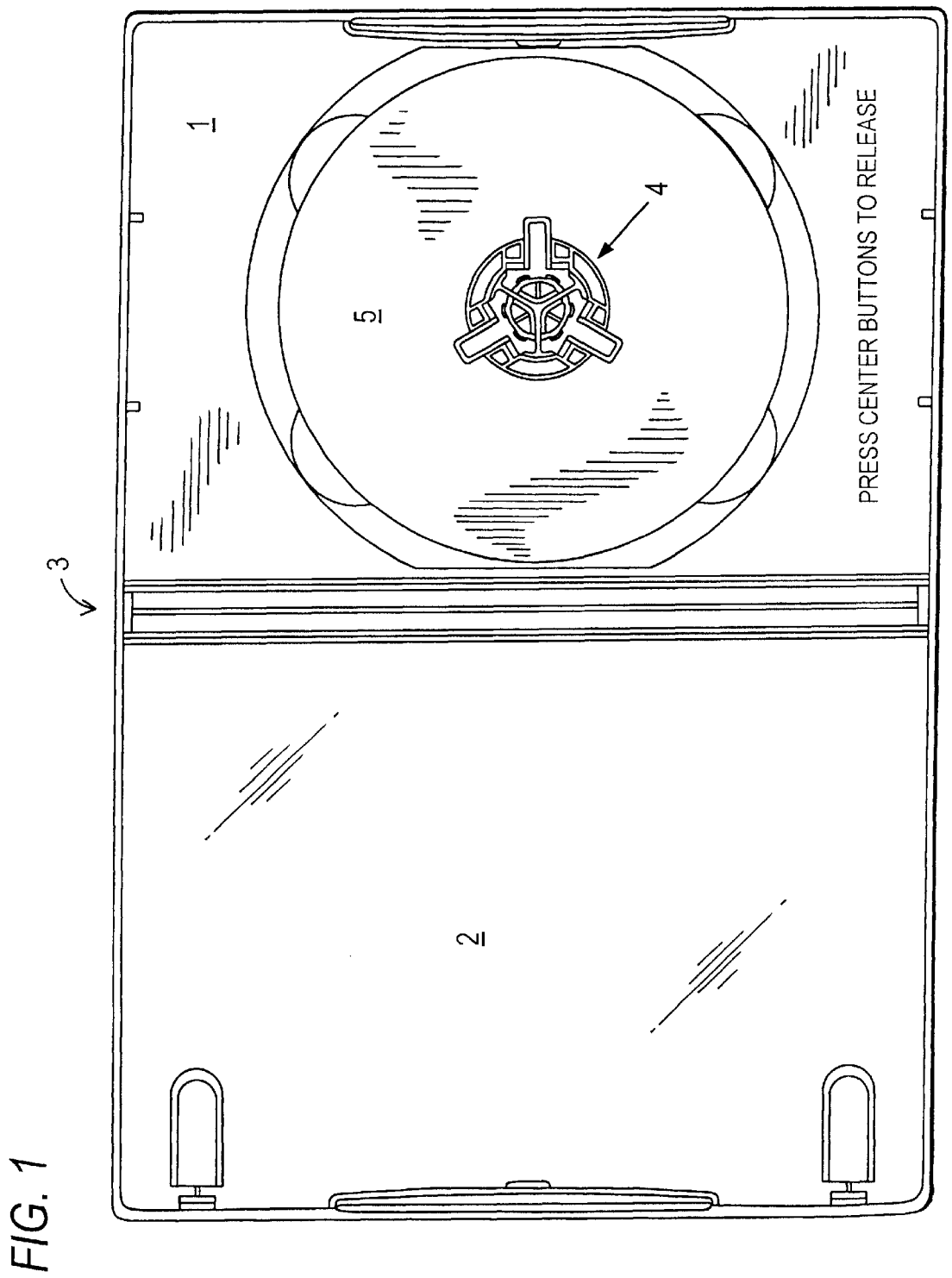
FIG. 1 is a plan veiw of a compact disk case which includes a disk receivable side and a cover to close the onto disk receiving side of the case.

With reference to FIG. 1 there is shown a case which can provide an enclosure to and hold a CD, DVD, VCD or a similar disk. The case preferably consists of a disk receiving portion 1 and a cover portion 2 which is able to move relative to the disk receiving portion by for example a hinged spine region 3 so that when in a closed condition both define an enclosure for a disk. The disk receiving portion 2 preferably is provided with a central region 4 provided for holding a disk, which will now be described in detail.

Figure 2:
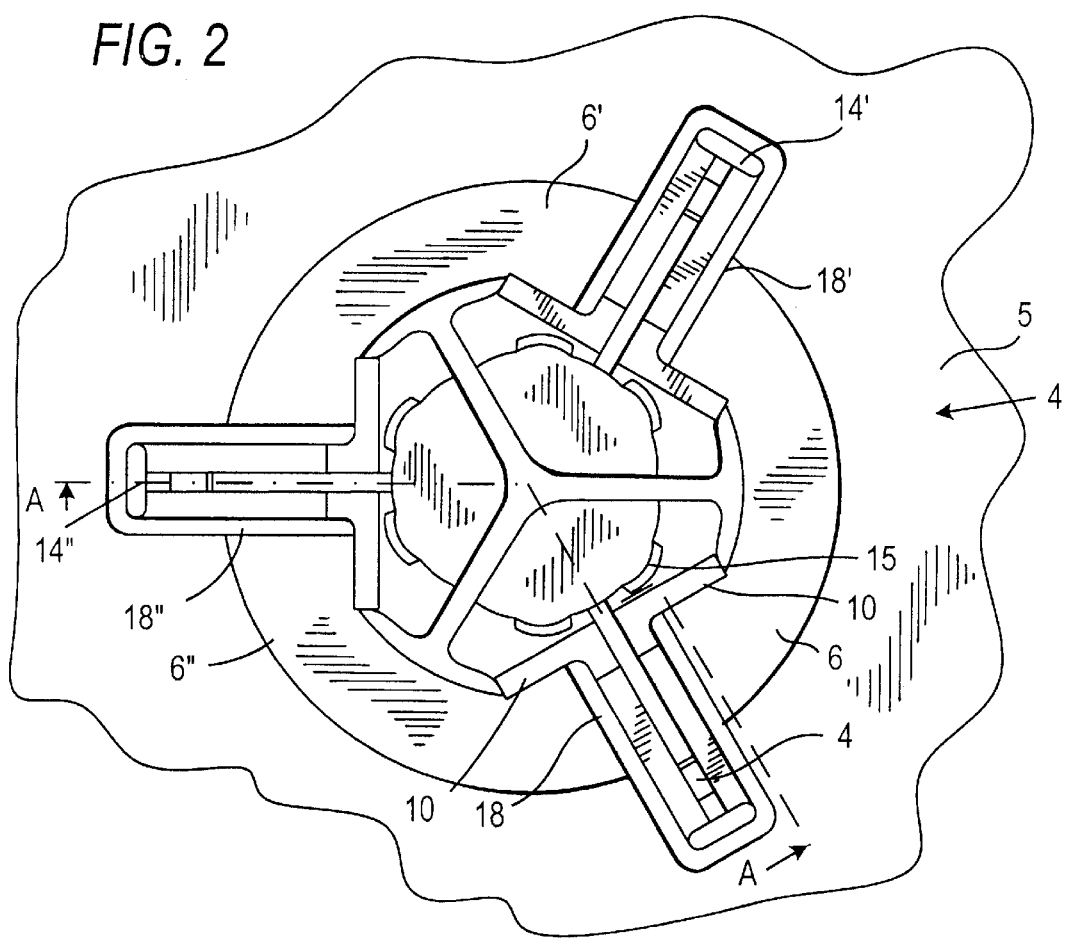
FIG. 2 is a plan view of the central portion of the disk receiving side of the case.

The central region 4 is provided at a body portion 5 of the disk receiving side of the case. The body portion 5 may for example substantially entirely provide the disk receiving side of the case or may be a separate or stepped moulding therefrom. It may also be an insert receivable within the portions defining the case for the disk. In the most preferred form the body portion includes or is provided (i.e. as an insert) with a disk support member. By way of reference to FIG. 3 the disk support member 6 is preferably a stepped or plateau region extending from the body portion 5. When in a natural state, and where a disk 17 is received by the apparatus, the disk 17 will rest on the disk support member. The disk support member in this case is preferably a substantially planar region and is preferably made up of three segments 6, 6' and 6" as shown in FIG. 2. In an alternative, these disk support members may be provided as point supports as opposed to substantially planar support regions. The outwardly most diameter from the centre of the compact disk where the disk support members are provided, should be no greater than the initial region extending from the aperture of the compact disk outwardly towards the perimeter where no data is provided. Such limitation of diameter of where the disk support regions engage the compact disk will prevent any damage occurring to the recorded or data containing surface of the disk by the disk support. In the most preferred form the disk support regions extend from the body portion 5 by an upstand 7. As it is desirable for the disk support member to be relatively rigid, this upstand 7 preferably extends perpendicular to the substantially planar nature of the body portion.

Figure 3:
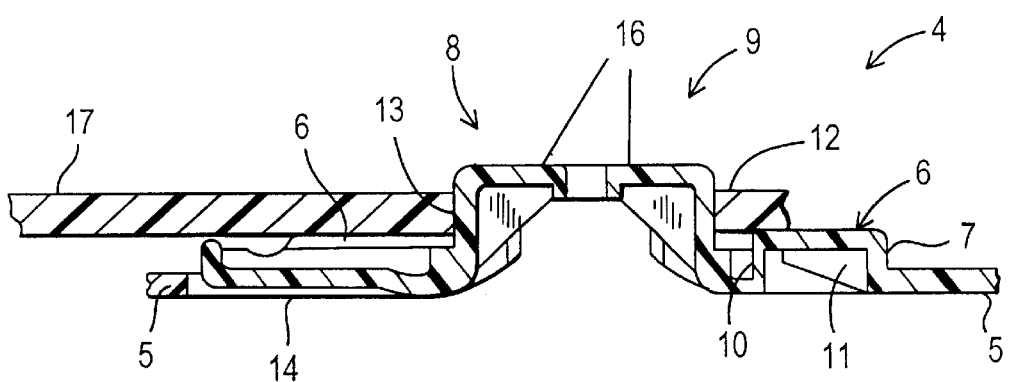
FIG. 3 is a sectional view along section AA of FIG. 2.

The apparatus for holding the compact disk also includes at least two members 8, 9 which most preferably act independent of each other but may alternatively be connected by a hinging engagement directly or indirectly via a third member. In the most preferred form they act independently from each other but act together for the operative holding of a disk. Each depends from the disk support member(s) by at least one arm 10 extending from the disk support member(s). For each member there are preferably two arms, located to connect the member an each side thereof to the respective disk support member. The arm preferably extends substantially downwardly and preferably vertically downwardly from the disk support member. The arms may for example extend from an inner edge of the disk support member or from a downwardly projecting surface thereof. It is from this at least one arm that each of the two members is pivotably dependent from the disk support member. The regions from which the at least one arm extends from the disk support member is substantially rigid. Reinforcing webs such as webs 11 will enhance the rigidity of the disk support member relative to the body portion. The arm is a flexibly rigid portion and can be pivoted/ cantilevered relative to the disk supporting member. The nature of the rigidity is such that the tendency exists for the arms to move the members to a condition as shown in FIG. 3 (a disk locating condition).

The at least two members also provide the disk locating means 12, 13 which are adapted to be received by the central hole of the disk, These disk locating means may be of a diameter substantially similar to the diameter of the central hole of the disk and may retain the disk by way of friction thereon. Alternatively a disk retaining means such as a lip or catch 15 may be provided on each of the members. The lip or catch on the members are preferably at a diameter from each other, larger than the central hole of the disk when the members are in a disk locating condition.

Figure 5:
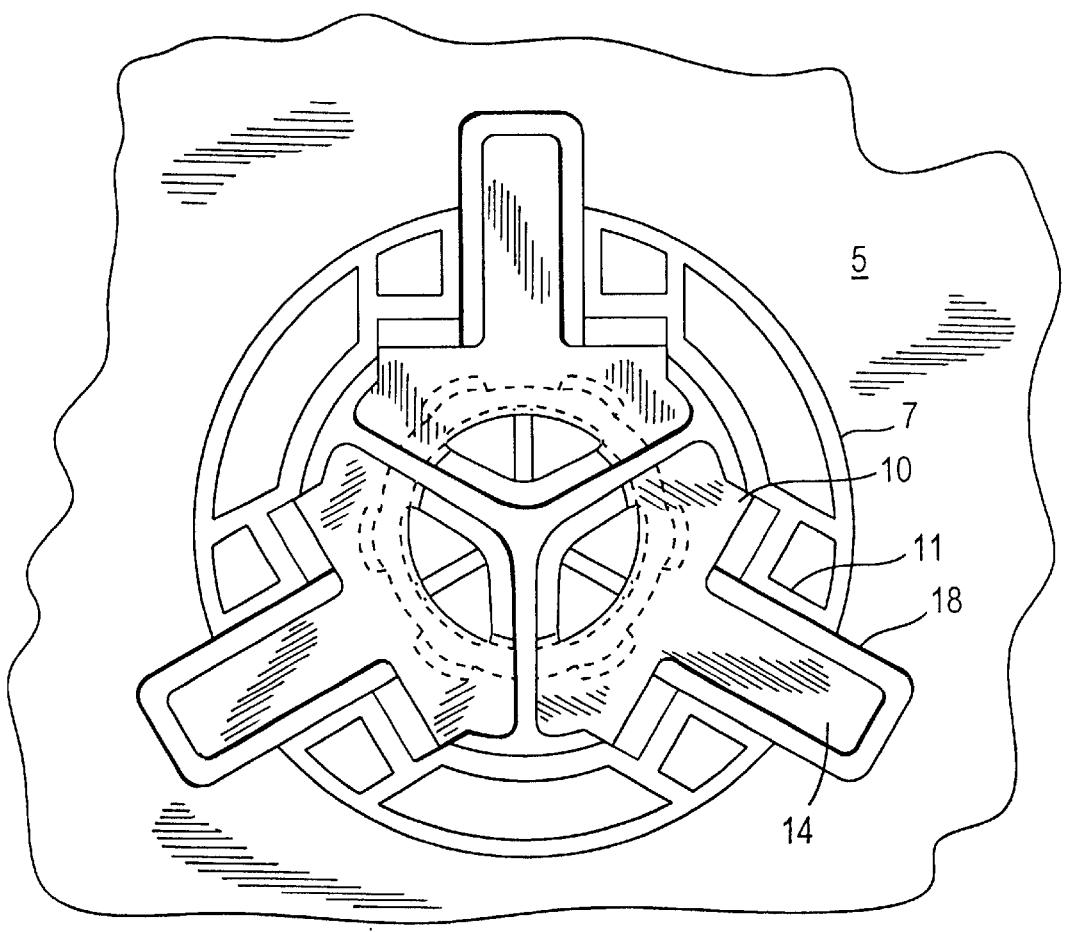
FIG. 5 illustrates a bottom view of the central portion of the disk receiving side of the case.
Figure 6:
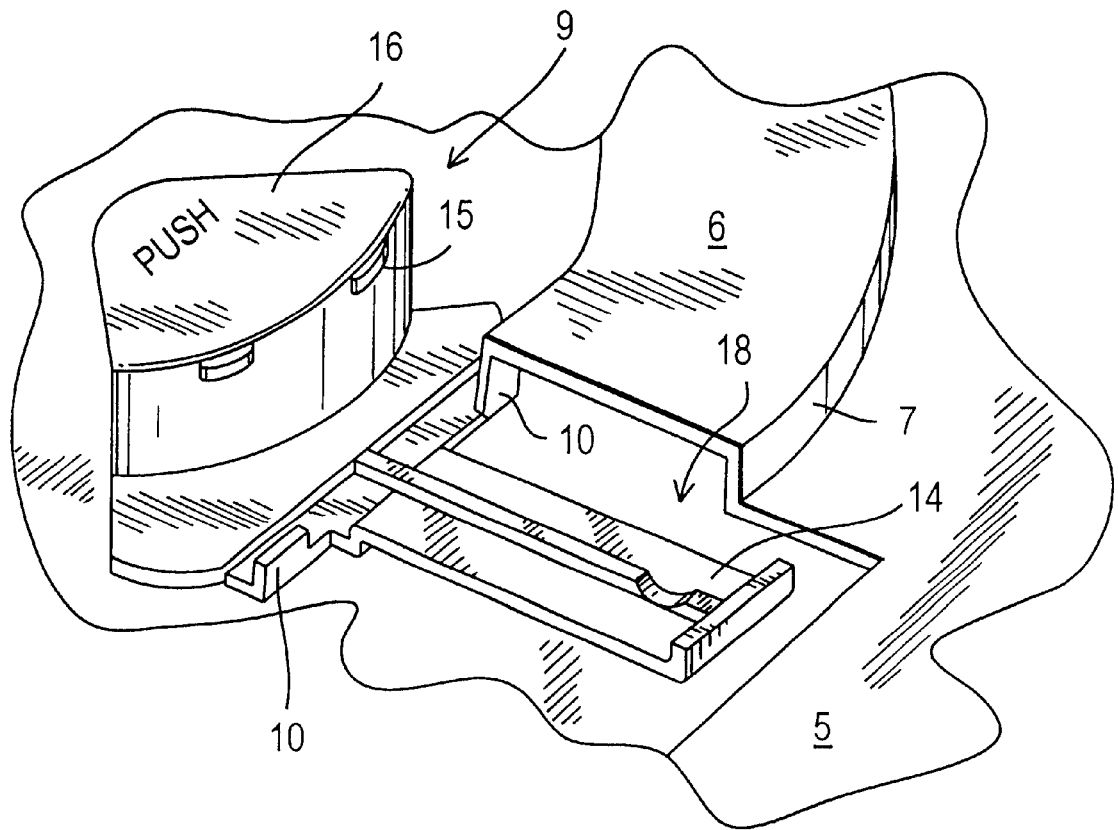
FIG. 6 is a partial perspective of one member and associated lifting arm located to the disk support member (shown in part) by the arms.

Also extending from the at least two members for each member, is a disk lifting arm. In the preferred form there are 3 members each with a lifing arm 5, 15' and 15". These lifting arms are preferably integrally formed with each of the members and extend preferably substantially radially outwardly therefrom. FIG. 5 illustrates in detailed shading, the preferred unity of a member and a lifting arm. With reference to FIG. 2 to explain the drawings more clearly, the disk lifting arms are separated from the surrounding moulding by a gap 18, 18', 18".

Figure 4:
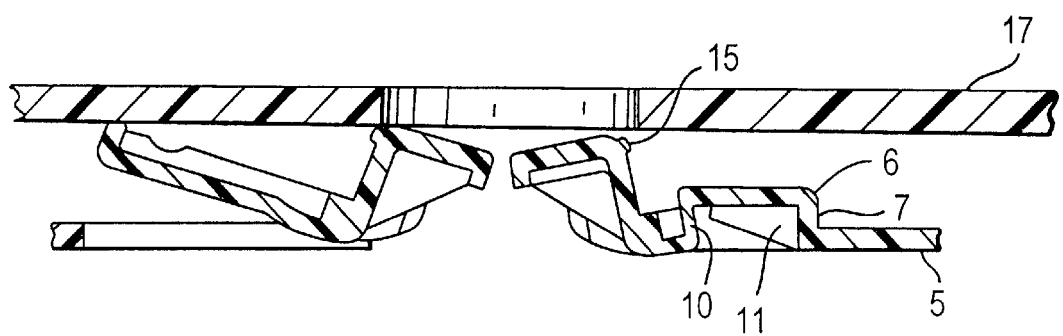
FIG. 4 illustrates a disk in an ejected condition raised from the disk locating means and disk support member by the lifting arms.

The lifting arms are provided with lifting regions preferably at their distal most end which can engage with the downwardly facing surface of a disk. In the most preferred form, the distal ends, when the apparatus of the present invention is in its natural/disk locating state, are not engaged with the downwardly facing surface of the disk. When a pressure is applied to displace the at least two members (preferably by providing a downward force onto a button like extension 16 of the members) will the lifting arms engage with the downwardly facing surface of the disk and displace the disk upwardly relative to the disk support member. This can for example can be seen in FIG. 4 where the disk has been displaced upwardly by the lifting of the disk by the lifting arms. The lifting arms are displaced upwardly as the button like extensions 16 receive the application of a downward force. This results in the members pivoting relative to the base portion and disk support member as a result of the connection of the members to the disk support member via the at least one arm, and will move the disk locating means inwardly relative to each other and will also result in the disk retaining means is (if provided) from displacing towards each other such that the disk can disengage itself from the disk locating means.

The fact that the at least one arm for each of the two members extends downwardly from the disk support means results in the movement of the two members and in particular the displacement of the arms upwardly and the disk retaining means inwardly relative to each other without there being any or any significant movement of the disk support means.

This suspension like arrangement provided the arms is a simplified alternative of the prior art means of achieving a pivoting motion of the disk locating means and lifting arms. The apparatus of the present invention is able to be molded on one piece, and a one piece moulding can provide the entire case incorporating the apparatus.

What is claimed is:

1. An apparatus for holding a compact disk having a central hole, the apparatus comprising a body portion which includes a disk support member at least two pivot members each pivotably dependent from and connected to said disk support member by at least one arm extending downwardly from said disk support member said at least two pivot members each providing a disk locating member receivable in the central hole of a said disk a disk lifting arm integrally formed from, and extending outwardly from each said pivot member an actuator to move said pivot members from a disk locating condition to a disk released condition whereby when a disk is supported on said disk support member, and pressure is applied to said actuator, the at least two pivot members move toward each other to release the disk locating member from the central hole and simultaneously said disk lifting arms displace said disk upwardly from said disk supporting member.

2. An apparatus as claimed in claim 1 wherein each said disk locating member provides at least one catch member disposed outwardly from each said disk locating member to locate, when a disk is received thereby, onto the outwardly facing surface of said disk when a disk is attempted to be removed without said pressure being applied to said actuator.

3. An apparatus as claimed in claim 1 wherein said lifting arms provide lifting regions for the engagement with the downwardly facing surface of said disk, and are positioned outwardly on said lifting arms to a distance no greater than for said lifting regions to impinge on the information carrying surface of the disk.

4. An apparatus as claimed in claim 1 wherein each said pivot member is pivotably dependent from said disk support member by two said arms.

5. An apparatus as claimed in claim 1 wherein said pivot members are independently movable to each other.

6. An apparatus as claimed in claim 1 in a disk locating condition, each said pivot member to act together to allow said disk to rest on said disk support member and places the disk locating member in a position to allow said disk to be free to spin about said disk locating member.

7. An apparatus as claimed in claim 4, each arm being provided to be a resiliently cantilevered arm from said disk support member.

8. An apparatus as claimed in claim 1, wherein each of the at least two pivot members is suspended from said disk support member by said at least one arm.

9. An apparatus as claimed in claim 1, wherein the at least one arm is two arms.

10. An apparatus for holding a compact disk having a central hole, the apparatus comprising a body portion which includes a disk support member at least two pivot members each pivotable relative to the disc support member dependent from and connected to said disk support member by at least one arm extending downwardly from said disk support member said at least two pivot members each providing a disk locating member receivable in the central hole of a said disk a disk lifting arm integrally formed from, and extending outwardly from each said pivot member an actuator to move said pivot members from a disk locating condition to a disk released condition whereby when a disk is supported on said disk support member, and pressure is applied to said actuator, the at least two pivot members move toward each other to release the disk locating member from the central hole and simultaneously said disk lifting arms displace said disk upwardly from said disk supporting member.

* * * * *